US008555947B2

(12) United States Patent
Scherl et al.

(10) Patent No.: US 8,555,947 B2
(45) Date of Patent: Oct. 15, 2013

(54) DEVICE AND METHOD FOR APPLYING ELASTIC FILM SLEEVES TO CONTAINERS

(75) Inventors: Stefan Scherl, Neunburg Vorm Wald (DE); Christian Holzer, Schirling (DE); Günter Frankenberger, Köfering (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/351,326

(22) Filed: Jan. 17, 2012

(65) Prior Publication Data

US 2012/0180938 A1 Jul. 19, 2012

(30) Foreign Application Priority Data

Jan. 17, 2011 (DE) ......................... 10 2011 002 789

(51) Int. Cl.
*B29C 65/78* (2006.01)

(52) U.S. Cl.
USPC ............ 156/538; 156/539; 198/375; 198/379

(58) Field of Classification Search
USPC .......... 156/165, 423, DIG. 11, 538, 539, 443; 198/375, 379
See application file for complete search history.

(56) References Cited

U.S. PATENT DOCUMENTS

| | | | |
|---|---|---|---|
| 3,767,496 A | 10/1973 | Amberg et al. | |
| 5,433,057 A * | 7/1995 | Lerner et al. | 53/399 |
| 7,060,143 B1 * | 6/2006 | Eiban et al. | 156/86 |
| 2010/0163164 A1 * | 7/2010 | Deonarine et al. | 156/229 |

FOREIGN PATENT DOCUMENTS

| | | | |
|---|---|---|---|
| EP | 2316738 | A2 | 5/2011 |
| JP | 1099935 | A | 4/1989 |
| JP | 2000289715 | A | 10/2000 |
| JP | 2000296823 | A | 10/2000 |
| WO | WO-00/66437 | A1 | 11/2000 |
| WO | WO-2008076718 | A1 | 6/2008 |

OTHER PUBLICATIONS

European Search Report for Application No. 11193773.6, dated May 29, 2012.
German Search Report for 102011002789.0, dated Jun. 21, 2011.

* cited by examiner

*Primary Examiner* — Katarzyna Wyrozebski Lee
*Assistant Examiner* — Vishal I Patel
(74) *Attorney, Agent, or Firm* — Marshall, Gerstein & Borun LLP

(57) ABSTRACT

A device and method for applying elastic film sleeves to containers, where a plurality of stretching units for stretching the film sleeves and a plurality of removal units for removing the containers that have been provided with the film sleeves are mounted on a labeling carousel. Furthermore, a label dispenser is provided for equipping the stretching units with the film sleeves. Due to the fact that the removal units include gripping units that can be moved back and forth with respect to the labeling carousel between a gripping position for gripping the containers and an avoidance position for avoiding a collision with the label dispenser, the size and shape of the gripping units can be varied flexibly. Also, an evasion movement of the stretching units in the area of the label dispenser is dispensable.

9 Claims, 4 Drawing Sheets

DEVICE AND METHOD FOR APPLYING ELASTIC FILM SLEEVES TO CONTAINERS

CROSS-REFERENCE TO RELATED APPLICATION

The present application claims the benefit of priority of German Application No. 1020011002789.0, filed Jan. 17, 2011. The entire text of the priority application is incorporated herein by reference in its entirety.

FIELD OF THE DISCLOSURE

The disclosure relates to a device for applying elastic film sleeves to containers, as well as to a corresponding method using the device, such as in beverage bottling operations.

One way of labeling containers, such as beverage bottles, for example, is by drawing elastic film sleeves over the container's outside surface. For this, WO 2008/076718 describes a device for applying highly elastic labeling sleeves in which a plurality of spreading fingers running essentially parallel to one another and grouped circumferentially around a central opening are used to stretch the labeling sleeves apart so far that the container that is to be labeled can be lifted into the labeling sleeves from below. The container, with the label that has been applied, can then be removed from the spreading fingers upwards by a gripping device in the area of the bottle mouth. To this end, the gripping device rotates together with the spreading fingers around the labeling wheel, so that the labeled container can be transferred to a suitable discharge device after being lifted out of the spreading fingers. The labeling sleeves are pulled from a stationary label dispenser onto the spreading units from above. In order to guarantee the most reliable transfer possible of the labeling sleeves to the spreading units, the label dispenser and the spreading units are arranged in the area of the label dispenser essentially on a common pitch circle of the labeling wheel when viewed from above.

Due to the fact that the gripping devices for removing the labeled containers are also aligned essentially coaxially with respect to the spreading units, the problem that arises is that it is possible to avoid a collision of the gripping devices with the stationary label dispenser only with major restrictions. For example, the vertical position of the gripping units must be restricted to a confined area in order to guide the gripping units through an opening provided on the interior of the label dispenser. For example, the opening is located in an area between the transport rollers of the label dispenser. Furthermore, container clamps provided on the gripping devices must be spread apart so far that these can be directed past a central unfolding pin of the label dispenser. As a result, either such devices can be dimensioned only for a very particular container type or a changeover to another container type is possible only with a great apparatus-based effort.

Alternatively, WO 2008/076718 proposes that the label dispenser be radially offset outwards, so that it does not collide with the gripping devices. As a result of this, however, the mechanically complex and heavy spreading units must be driven outwards in the area of the label dispenser with the help of a control cam in order to make it possible to drive the spreading units through centrally, under the label dispenser that is offset outwards. Such a problem solution is not practicable, however, due to the very large apparatus-based effort and the costs associated with it.

There is consequently a need for a device for applying elastic film sleeves to containers that can be adapted to different container sizes and film types with the lowest possible apparatus-based effort, while simultaneously allowing an optimal alignment of the described device components to one another and avoiding a collision of moving components with the stationary label dispenser.

SUMMARY OF THE INVENTION

The above need is solved with a device according to the disclosure, which includes circulating removal units for removing the containers that have been provided with the film sleeves by means of gripping units that can be moved back and forth with respect to the labeling carousel between a gripping position for gripping the containers and an avoidance position for avoiding a collision with the label dispenser. What is meant here is the position of the gripping unit as a whole, or consequently, for example, a base body of the gripping unit that is independent of the opening and closing state of the gripping unit. In other words, the circulating path of the gripping units deviates from a circular path in the area in front of and/or next to the label dispenser. In addition to a change in the position of the gripping unit, it would also be possible to change the setting of individual gripping elements, such as gripping jaws, with respect to one another. For example, the gripping units could be open or closed in the avoidance position. In other words, the gripping position and the avoidance position differ from each other in the position that an open gripping unit takes in each case with respect to the labeling carousel. Due to the fact that the gripping units can change between a gripping position and an avoidance position, an adjustment in the position of the stretching units with respect to the labeling carousel for avoiding a collision with the label dispenser is dispensable. The comparatively complex and heavy stretching units can consequently be arranged in a fixed position on the labeling carousel.

The distance from the gripping units to the axis of rotation of the labeling carousel in the avoidance position is less than in the gripping position. As a result, the gripping units can be guided past the label dispenser along a circulating path that deviates inwards from a circular path, at least in sections. An avoidance position that is offset inwards with respect to the gripping position can be realized with an especially low apparatus-based effort.

In an advantageous development, the gripping units are supported in such a way that they can slide radially and/or pivot laterally. A horizontal pivoting around a vertical axis is especially favorable. The radial position of the gripping units on the labeling carousel can be realized in an especially simple manner by such supports with the help of cam controllers.

In a further advantageous embodiment, the avoidance position lies above the gripping position in order to drive the gripping units away above the label dispenser. This configuration takes advantage of the fact that the labeled containers have to be lifted in any case for the removal from the stretching units and the transfer to downstream discharge devices. Therefore under some circumstances, only a minor additional lift is required in order to lift the gripping units far enough that they can be driven away above the label dispenser. In this case, it may be possible to save an additional diverting mechanism for the change between the gripping position and the avoidance position.

The gripping units thereby are preferably supported on the removal units in such a manner that they can slide vertically and/or pivot vertically. This makes possible reliable control of the gripping units by means of cam rollers with a simple apparatus-based effort.

In an especially favorable development, each of the removal units comprises a lifting mechanism for lifting and lowering the gripping unit, whereby this lifting mechanism can slide radially and/or pivot laterally. This makes possible an especially flexible three-dimensional change in the position of the gripping units for removing the labeled containers and for preventing a collision between the gripping units and the label dispenser.

A servo motor is preferably provided for driving the lifting mechanism. In this way, the lifting mechanism can be adapted to different container sizes and film types in an especially flexible manner.

In an especially favorable development of the device according to the disclosure, the gripping position is aligned with respect to the label dispenser in such a way that the major axes of the containers held in the gripping position and the major axes of the film sleeves during dispensing lie on a common pitch circle of the labeling carousel. In this way, the film sleeves can be transferred to the stretching units in an especially reliable manner and the labeled containers can be removed from the stretching units in an especially simple manner. A change in the radial position of the stretching units between the feeding of the labels and the removal of the labeled containers is in particular dispensable thereby. This is particularly advantageous because the stretching units are especially complex and difficult to adapt to different containers when compared to the gripping units. A preferred permanent assembly on the labeling carousel can consequently be realized for the stretching units in particular.

The label dispenser is preferably arranged in an essentially stationary manner above the stretching units in order to shoot the labeling sleeves from above onto the stretching units that run through below the label dispenser. The labeling sleeves can be positioned onto the stretching units with a configuration of this kind especially reliably and at an especially high speed. This consequently allows especially high machine performances to be realized. To this end, at least two label dispensers can also be provided, one behind the other, along the circulation path of the stretching units. In this way, the reliability of the labeling, the feeding and the speed of the labeling carousel can be simultaneously increased.

The gripping units preferably comprise switchable container clamps that are in particular switchable by means of a control cam. To be understood here as switchable container clamps are such clamps for which at least a closed setting is provided for holding the containers, as well as an opened setting, and for which it is possible to change actively between the opened and the closed setting by means of a suitable switching mechanism. The container clamps here are preferably in a closed setting only when gripping the labeled container and until the transfer to a downstream discharge unit. In their opened setting, the container clamps can preferably be spread so far apart that the container clamps are aligned essentially tangentially to the circulating path of the container clamps or parallel to the common pitch circle defined in the preceding.

In an especially advantageous development of the device according to the disclosure, the removal units comprise cam-controlled linear guides and/or cam-controlled pivot mechanisms in order to change between the gripping position and the avoidance position. Guides of this kind are especially reliable for avoiding a collision of the gripping units with the label dispenser. In other words, the cam controller is especially less susceptible to failure with respect to a sudden malfunction of the adjustment between the gripping position and the avoidance position.

The need of the prior art is furthermore solved with a method according to the disclosures, in which the circulating path of the gripping units deviates, particularly inwards or upwards, from a planar circular path at least within a rotational angle range of from 5 to 45° before reaching the label dispenser in order to avoid the label dispenser. The gripping units can consequently circulate across a large rotational angle range in the gripping position. A large machine angular range can consequently be used for the labeling. This allows an especially high machine performance level and an especially space-saving design. The gripping units can likewise deviate from a circular circulating path in a range of from 0 to 5° in front of the label dispenser and in the area of the label dispenser, meaning after the label dispenser has been reached. A major portion of the carousel rotation can consequently be used for labeling along the circular path and a collision can simultaneously be reliably avoided. This maximizes the machine performance and the operational reliability.

The stretching units preferably circulate on a circular path in the area of the label dispenser. This simplifies the driving of the stretching units during the transfer of the film sleeves.

The gripping units are preferably opened in the avoidance position, particularly by a total opening angle of at least 90°, in particular at least 180°, relative to a closed position. In this way, the necessary radial change in position of the gripping unit between the gripping position and the avoidance position can be minimized. This allows an especially compact arrangement. Depending on the application, however, opening angles of from 45 to 90° are also possible.

The film sleeves are preferably transferred onto the stretching units from above and the labeled containers are removed upwards out of the stretching units.

BRIEF DESCRIPTION OF THE DRAWINGS

Preferred embodiments of the disclosure are shown in the drawing. Shown are.

DETAILED DESCRIPTION OF THE PREFERRED EMBODIMENT

Figure 1:
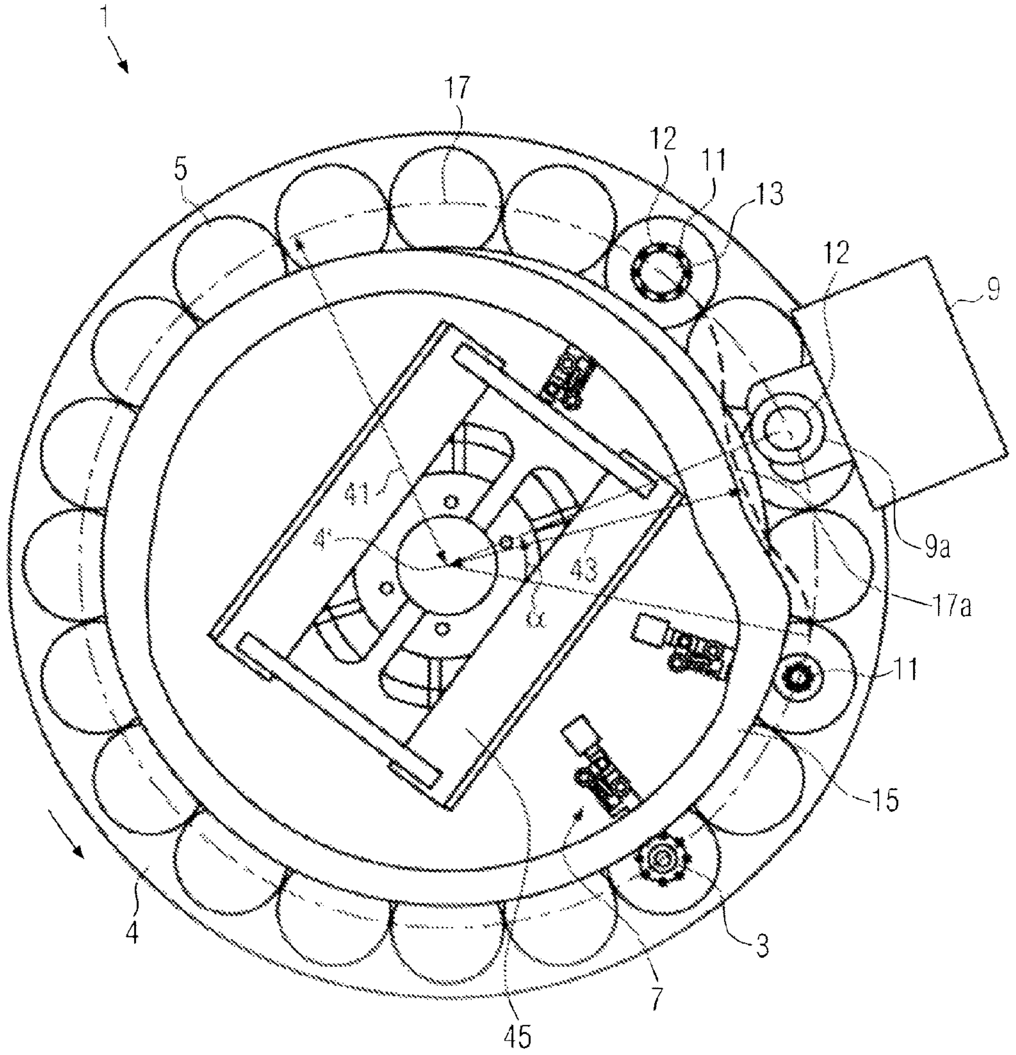
FIG. 1 a top view on to a first embodiment of the device according to the disclosure.

As can be seen in FIG. 1, a first embodiment 1 of the device according to the disclosure for applying elastic film sleeves 2 to containers 3, such as beverage bottles, for example, in particular such made of PET, comprises a labeling carousel 4, on which a multiplicity of stretching units 5 uniformly distributed on the circumference are provided for stretching the film sleeves 2. Removal units 7 for removing the containers 3 that have been labeled with the film sleeves 2 from the stretching units 5 and that rotate along are assigned to each of the stretching units 5, whereby in FIG. 1 only three removal units 7 are shown for the sake of clarity.

Provided in the circumferential edge area of the labeling carousel 4, shown in the example rotating counter-clockwise, is furthermore an essentially stationary label dispenser 9 with a shooting mechanism 9*a* for shooting the film sleeves 2 on to the stretching units 5 that run through below the shooting mechanism 9*a*. Such label dispensers 9 with suitable roller mechanisms are known from the state of the art. The film sleeves 2 are preferably highly elastic, for example, with an expansibility of at least 50%, and preferably are used for container labeling. They could, however, also be applied to the containers for another purpose.

The stretching units 5 comprise radially sliding spreading fingers 11 in order to stretch the film sleeves 2 so far apart that the containers 3 that are to be labeled can be slid into the film sleeves 2 from below through a central opening 13 of the stretching units 5. After the spreading fingers 11 are driven together, these film sleeves 2 are transferred to the containers 3 so that the removal units 7 grip the containers 3 in their neck and/or shoulder area with the film sleeves 2 and can pull these upwards out of the stretching units 5.

FIG. 1 furthermore shows a control cam 15 for controlling and/or switching the removal units 7. Furthermore indicated is an imaginary pitch circle 17 of the labeling carousel 4. As can furthermore be seen in FIG. 1, the pitch circle 17 runs through the middle axes of the stretching units 5 and through the middle axis of the shooting mechanism 9*a*. This guarantees that the radial position of the film sleeves 2 with respect to the labeling carousel 4 is aligned with the radial position of the stretching units 5 during the transfer to the stretching units 5.

Figure 2:
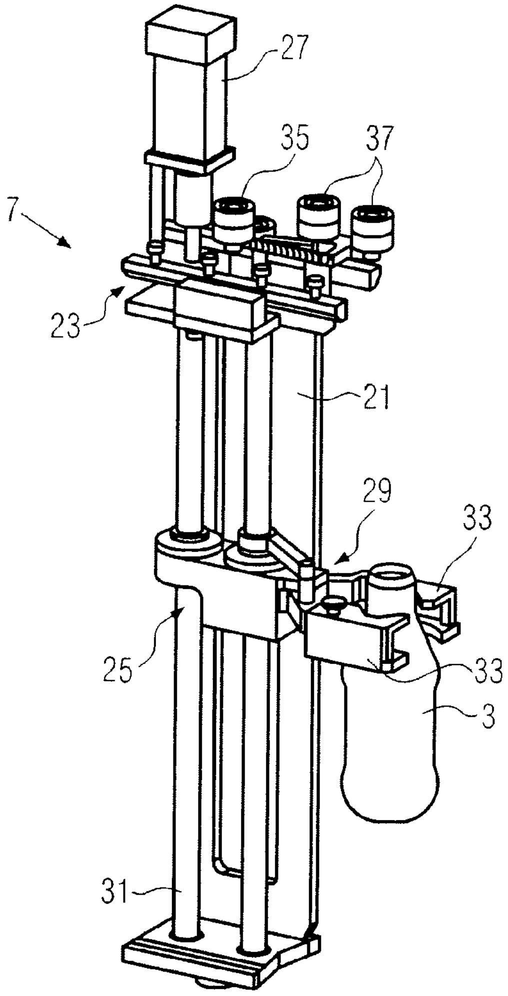
FIG. 2 a removal unit of the device shown in FIG. 1.

FIG. 2 shows a removal unit 7 in detail. The removal unit 7 accordingly comprises a frame 21, a linear guide 23 and a lifting device 25. The frame 21 is mounted on the labeling carousel 4 by means of the linear guide 23. The lifting device 25 is supported in the frame 21, for example, by means of a shaft guide. The lifting device 25 comprises a servo motor 27 and a gripping device 29, which can be lifted or lowered by the servo motor 27 by means of a threaded spindle 31. Switchable container clamps 33 are provided on the gripping device 29, whereby these can be opened or closed with the help of a sprocket 35. The container clamps 33 are preferably formed as a fitting part in such a manner that they can be changed quickly.

Control rollers 37 are provided for activating the linear guide 23, whereby these control rollers 15 mesh in the control cam 15 in order to displace the lifting device 25 essentially radially along the linear guide 23. As a result of the displacement along the linear guide 23, the gripping unit 29 can be adjusted between an outer gripping position 41 and an inner avoidance position 43. A displacement of the gripping units 29 in the radial direction can be realized in an especially simple manner. A position of the linear guide 23 that is horizontally rotated and/or vertically tipped with respect to the radial alignment would also be conceivable, however.

The gripping position 41 and the avoidance position 43 are indicated only schematically in FIG. 1 using radial double-headed arrows. On this basis, however, it can be seen that the gripping position 41 is defined by the fact that the major axis of the container 3 held in the gripping unit 29 essentially lies on the pitch circle 17. In contrast, the avoidance position 43 is essentially defined by the fact that the circulating path of the gripping units 29 deviates from the pitch circle 17 in the area of the label dispenser 9 so far, and namely in the example of FIG. 1 in a path section 17*a*, inwards, that the gripping unit 29 can be guided past the label dispenser 9, particularly past the shooting mechanism 9*a*, without a collision. In the circumferential sub-areas of the circulating path in which the gripping units 29 are not needed for removing and holding a labeled container 3, any curve profiles of the control cam 15 and corresponding path curves of the gripping units 29 are conceivable.

The servo motor 27 is especially well-suited for a flexible adaptation of the lift of the lifting unit 25 to different container sizes and film types. The removal of the labeled containers 3 from the stretching units 5 can also be regulated especially precisely with the help of the servo motor 27. In particular, the control of the servo motor 27 can be coordinated with the control of the spreading fingers 11, which can likewise be driven by servo motors (not shown). For example, the activation can be brought about with a control unit 45 indicated in FIG. 1.

Figure 3:
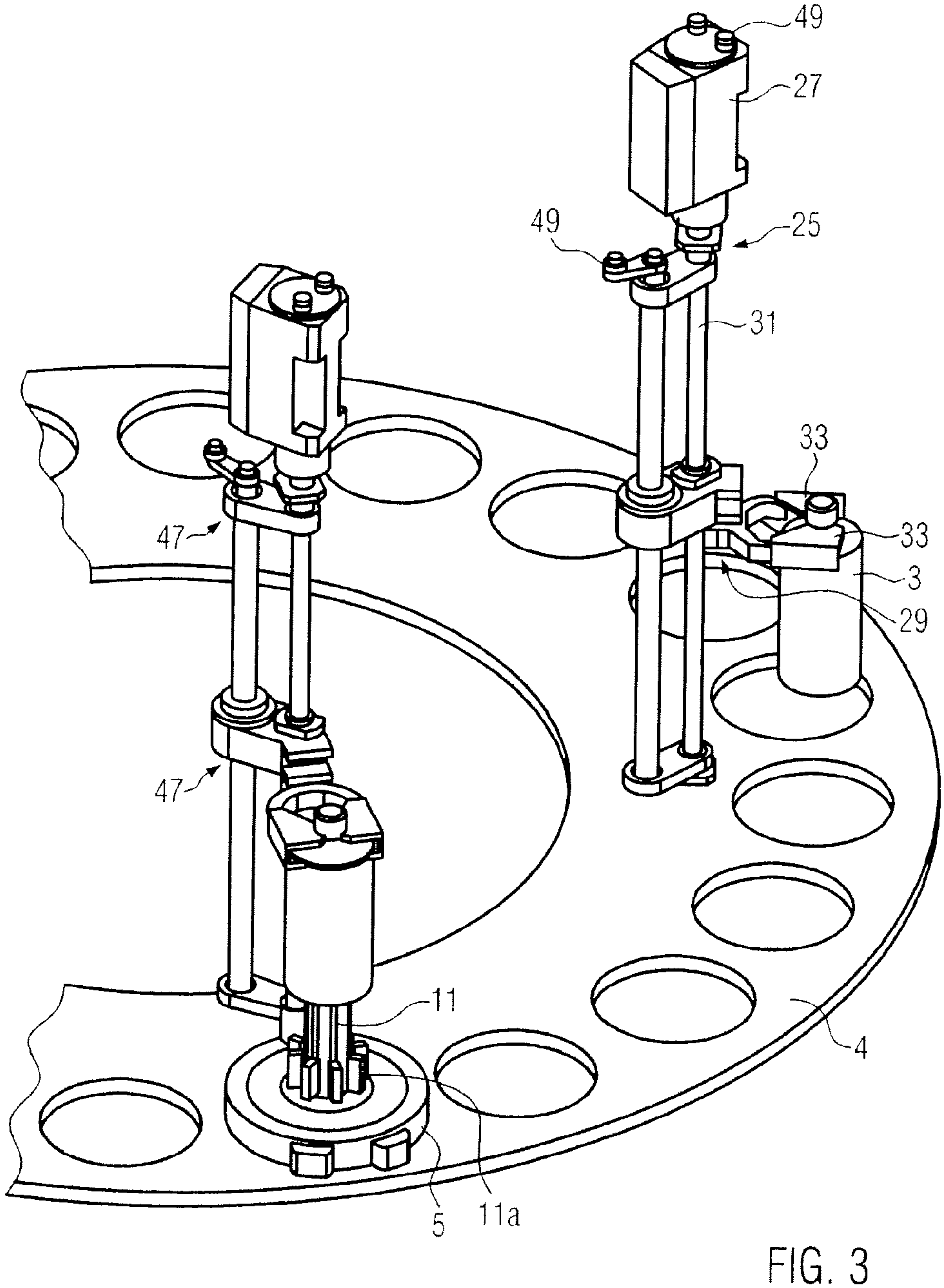
FIG. 3 a diagonal view of a second embodiment of the disclosure with an alternative variant of the removal unit.

FIG. 3 shows an alternative variant of the removal unit 7 in which a lateral pivot mechanism 47 is provided instead of the linear guide 23. The remaining components and functions of the second embodiment essentially correspond to those of the first embodiment. Identical or equivalent components and functions of the second embodiment are therefore not described in detail. For the sake of simplicity, only one stretching unit 5 with the accompanying spreading fingers 11 is shown in FIG. 3. Here additional spreading jaws 11*a* are provided on the spreading fingers 11 as optional variants, whereby these spreading jaws 11*a* are used, for example, as quick-change fitting parts for an adaptation of the spreading fingers 11 to certain container sizes and/or label types.

Figure 4:
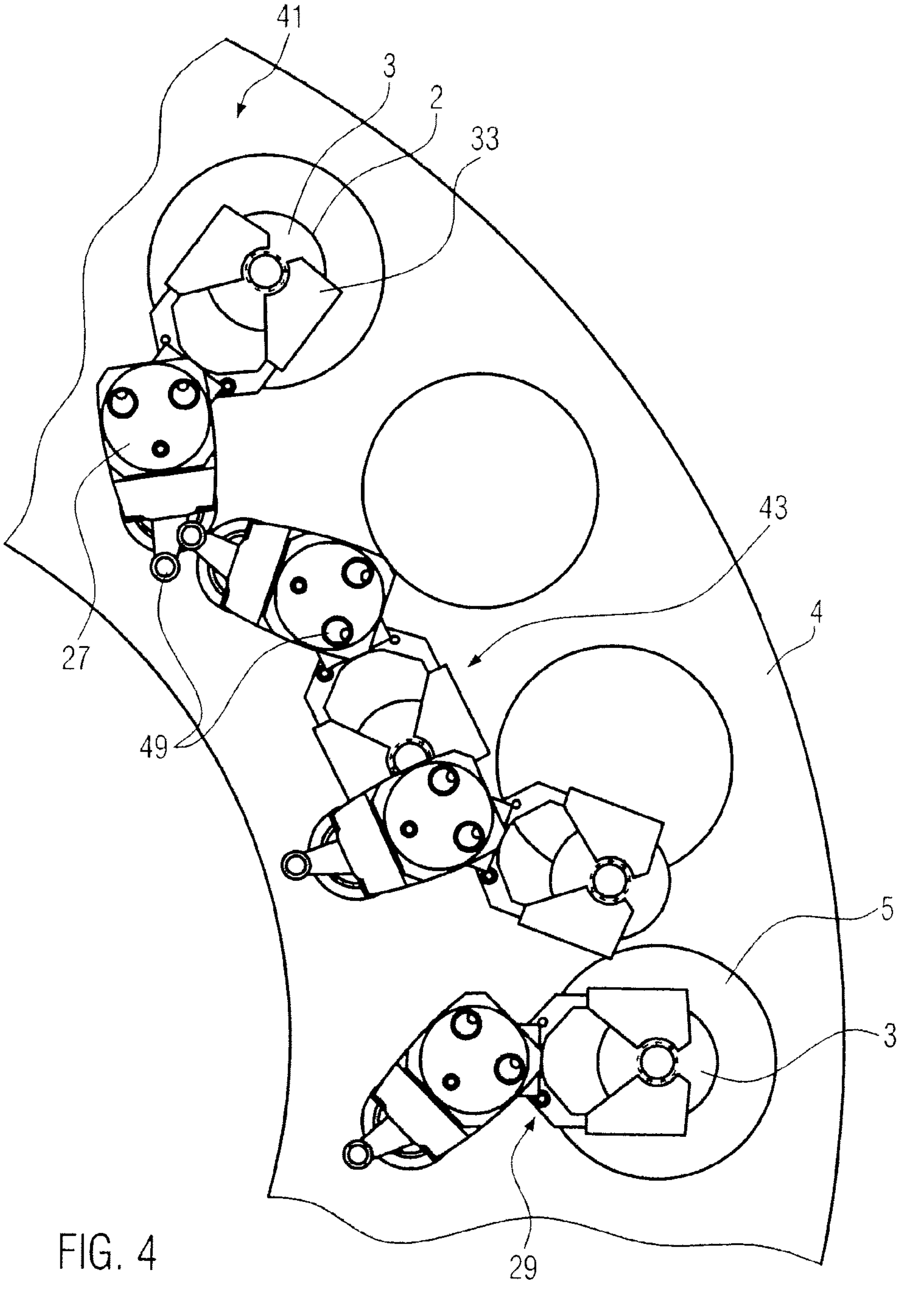
FIG. 4 a detail from FIG. 3 in a top view.

As FIG. 4 illustrates, the lifting units 25 can be pivoted together with the gripping units 29 and the servo motor 27 with the help of the pivot mechanism 47. This mechanism comprises suitable control rollers and/or sprockets 49 or the like for controlling the pivot movement with the help of the control cam 15. By pivoting the gripping units 29 away, it is possible to change between the gripping position 41 of the gripping units 29 and their avoidance position 43. In order to illustrate that the gripping position 41 and the avoidance position 43 differ with respect to the labeling carousel 4 with respect to the position of the entire gripping unit 29, which means independently of the setting of the grippers 33 with respect to one another, each of the gripping units 29 is shown in a closed setting and holding a container 3. The gripping units 29 could likewise be shown in an open setting for illustrating the change in position. It shall be understood hereby that the gripping units 29 normally do not hold any containers 3 when running past the label dispenser 9.

Depending on the size and construction of the container clamps 33, these can be guided past the label dispenser 9 in a closed or in an opened setting. It is conceivable here that an opening of the container clamps 33 simplifies the process of guiding the gripping units 29 past the label dispenser 19. In this case, the container clamps 33 can be moved into a suitable setting, for example, an opened setting, with the help of the sprockets 35, not shown in FIG. 4. Depending on the position of the container clamps 33, the opened setting is spread by at least 90°, preferably at least 180°, with respect to the closed setting. In this way, where necessary an essentially tangential arrangement of the container clamps 33 with respect to the pitch circle 17 or the circulating path 17*a* can be adapted in the area of the label dispenser 9. Opening angles from 45 to 90° are also conceivable, however, depending on the application.

Alternatively or additionally to the previously described embodiments, a third embodiment would also be possible in which the gripping units 29 are lifted so far in the area of the label dispenser 9 that the gripping units 29 can be guided past this above the shooting mechanism 9*a*. For example, this could be achieved by a corresponding lift of the lifting device 25. In such a case, it would optionally be possible to do without additional guide rollers 37 or the like. It would also be conceivable, however, to combine both a lateral, particularly a radial, adjustment of the gripping units 29 as well as a vertical adjustment of the gripping units 29 in the area of the label dispenser 9 and a rotational angle range upstream of the label dispenser 19.

Regardless of the described embodiment, the change between the gripping position 41 and the avoidance position 43 preferably takes place in a rotational angle range α of from 5 to 45° upstream of the label dispenser 9 along the circulating path as is indicated in FIG. 1 by way of example. In this way, a sufficient deflection of the gripping units 29 before and in the area of the shooting mechanism 9*a* can be realized without significantly restricting the machine performance as a result of the evasion movement. Especially favorable is a variant in which the deflection of the gripping units 29 from the gripping position 41 into the avoidance position 43 takes place at least in an angular range α of 5 to 20° before the shooting mechanism 9*a*.

The described embodiments can be combined in any technically useful manner. The embodiments have in common that the change of the gripping units 29 from the gripping position 41 into the avoidance position 43 and back again can be realized in the device 1 according to the disclosure in a manner that has a simple design. In particular, in this way a technically complex evasion movement of the stretching units 5 as they pass the labeling unit 9 is dispensable. The stretching units 5 and the shooting mechanism 9*a* of the label dispenser 9 can consequently be arranged with respect to each other in a position that is optimized with respect to the pitch circle 17.

The shown embodiments furthermore offer the advantage that the avoidance position 43 can be flexibly adapted to different container sizes and film types. For example, the lift of the removal units 7 can be flexibly adapted with the help of the servo motors 27. An adaptation of the radial displacement or a lateral pivoting movement of the gripping units 29 is also possible, in a manner that is technically reliable and that has a simple design, with the help of the cam controller described on the basis of the embodiments. The container clamps 33 can likewise be opened and closed here in a simple and reliable manner with the help of the sprockets 35.

Work with the device 1 according to the disclosure can proceed as follows:

A continuous flow of containers 3 that are to be labeled is fed to the labeling carousel 4 on a feeding level (not shown) below the components shown in FIG. 3 and is kept below the stretching units 5. Each of these containers is equipped with an elastic film sleeve 2 by the label dispenser 9. The gripping unit 29 assigned to the respective stretching unit 5 is driven into the avoidance position 43 so that this does not collide with the shooting mechanism 9*a* when passing the labeling unit 9. The stretching units 5 that have been equipped with the film sleeves 2 rotate farther on the labeling carousel 4, whereby the labeling sleeves 2 are spread apart so far with the help of the spreading fingers 11 that the container 3 provided on the lower feeding level can be slid upwards through the central opening 13 and into the elastically stretched film sleeve 2.

After passing the label dispenser 9, the gripping unit 29 is driven from the avoidance position 43 back into the gripping position 41. The container 3 provided under the stretching unit 5 is lifted and the stretched film sleeve 2 is transferred to the container 3. After closing the container clamps 33 around the container 3 and optionally around the film sleeve 2, the gripping unit 29 is lifted with the help of the lifting device 25 and pulled out of the area of the stretching unit 5. The container 3 that has been labeled in this way is lifted to a transfer height suitable for the transfer to an outlet star or the like and finally transferred. The gripping unit 29 can hereby remain in the gripping position 41 until it again reaches the area of the label dispenser 9.

The invention claimed is:

1. A device for applying elastic film sleeves to containers, comprising:

at least one label dispenser;

a labeling carousel that rotates about an axis and has a plurality of sleeving stations that include means for receiving film sleeves from the label dispenser and applying them to containers;

a plurality of removal units that are mounted on and rotate with the labeling carousel and have gripping units that remove sleeved containers from the sleeving station; and one or more actuators that move the gripping units between two positions at different radial distances from the axis of the labeling carousel: a) a gripping position in which the gripping units grip the sleeved containers and b) an avoidance position in which the radial distance between the gripping unit and the rotational axis of the labeling carousel is less than the radial distance between the gripping unit and the rotational axis of the labeling carousel when the gripping unit is in the gripping position.

2. The device according to claim 1, wherein the gripping units are supported in such a manner that they can one of slide in the lateral direction with respect to the carousel, pivot in the lateral direction with respect to the carousel, and a combination thereof.

3. The device according to claim 1, wherein the avoidance position lies above the gripping position in order to guide the gripping units away above the label dispenser.

4. The device according to claim 1, wherein the gripping units are supported on the removal units in such a manner that they can one of slide vertically, pivot vertically, and a combination thereof.

5. The device according to claim 1, wherein each of the removal units comprises a lifting mechanism that lifts and lowers the gripping unit and also slides radially, pivots laterally, or both slides radially and pivots laterally with respect to the carousel.

6. The device according to claim 5, wherein a servo motor is provided for driving the lifting mechanism.

7. The device according to claim 1, wherein the gripping position is aligned with respect to the label dispenser in such a way that the major axes of the containers held in the gripping position and the major axes of the film sleeves lie on a common pitch circle of the labeling carousel during the dispensing process.

8. The device according to claim 1, wherein the label dispenser is essentially arranged in a stationary manner above the stretching units in order to shoot the labeling sleeves from above on to the stretching units that run through underneath the label dispenser.

9. The device according to claim 1, wherein the device comprises a control cam that switches the gripping units between an open setting and a closed setting.

* * * * *